(12) United States Patent
Katrak et al.

(10) Patent No.: US 8,412,425 B2
(45) Date of Patent: Apr. 2, 2013

(54) TRANSMISSION CONTROL MODULE

(75) Inventors: Kerfegar Khurshed Katrak, Kalamazoo, MI (US); Ian Daniel McKenzie, Kalamazoo, MI (US); Anthony Stasik, Kalamazoo, MI (US); Jeffrey P. Hawarden, Lancashire (GB); Todd William Fritz, Kalamazoo, MI (US); Thomas R. Connolly, Portage, MI (US); Kim Ann Brown, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 484 days.

(21) Appl. No.: 12/705,063

(22) Filed: Feb. 12, 2010

(65) Prior Publication Data

US 2010/0204879 A1 Aug. 12, 2010

Related U.S. Application Data

(60) Provisional application No. 61/151,996, filed on Feb. 12, 2009.

(51) Int. Cl.
*G06F 7/00* (2006.01)

(52) U.S. Cl. ........ 701/63; 701/30.3; 701/30.5; 701/30.6

(58) Field of Classification Search ............... 701/30.3, 701/30.5–30.7, 31.7, 62, 63, 97; 702/58, 702/116; 477/154, 906, 907
See application file for complete search history.

(56) References Cited

U.S. PATENT DOCUMENTS

| | | | | |
|---|---|---|---|---|
| 5,855,532 A | * | 1/1999 | Sugiyama | ............ 477/97 |
| 6,073,072 A | * | 6/2000 | Ishii et al. | ............ 701/63 |
| 6,675,079 B2 | * | 1/2004 | Kwon | ............ 701/31.1 |
| 6,950,732 B2 | * | 9/2005 | Lumbis et al. | ............ 701/20 |
| 7,027,939 B2 | * | 4/2006 | Fey et al. | ............ 702/64 |
| 7,072,748 B2 | * | 7/2006 | Kwon | ............ 701/29.2 |
| 7,233,847 B2 | * | 6/2007 | Otsuka | ............ 701/30.6 |
| 2008/0059016 A1 | * | 3/2008 | Mayhew et al. | ............ 701/30 |

* cited by examiner

*Primary Examiner* — Jeremy R Severson
(74) *Attorney, Agent, or Firm* — Rader, Fishman & Grauer PLLC (57) ABSTRACT

An exemplary transmission system includes a plurality of sensors each configured to output a signal at least partially representative of a speed of at least one of a first transmission input shaft, a second transmission input shaft, a transmission output shaft, and an engine. A transmission control module is in communication with the plurality of sensors and is configured to identify at least one of the plurality of sensors as a failed sensor and another of the plurality of sensors as a working sensor. The transmission control module is further configured to estimate the signal of the failed sensor based on a predetermined relationship between an expected signal from the failed sensor and the signal received from the working sensor.

22 Claims, 8 Drawing Sheets

TRANSMISSION CONTROL MODULE

CROSS-REFERENCE TO RELATED APPLICATION

This application claims priority to provisional patent application U.S. 61/151,996 filed on Feb. 12, 2009, the contents of which are incorporated by reference.

BACKGROUND

Vehicles often rely on signals received from sensors to operate properly. For instance, a transmission control module uses multiple sensors to determine when to change gears to optimize performance, fuel economy, and shift quality. If one of the sensors malfunctions, however, the transmission control module receives inaccurate information, which could result in less than optimum performance. In addition, the transmission control module may itself malfunction. Even though the transmission control module receives the correct signal from one or more of the sensors, the processor in the transmission control module may process the received signal incorrectly.

Accordingly, a transmission control module is needed that can identify malfunctioning sensors and compensate for inaccurate signals received from the malfunctioning sensors. In addition, a transmission control module is needed that safeguards against a malfunctioning processor within the transmission control module.

DETAILED DESCRIPTION

An exemplary system includes a plurality of sensors each configured to output a signal representative of, for example, a rotational speed of a first transmission input shaft, a second transmission input shaft, a transmission output shaft, or an engine. The exemplary system further includes a transmission control module that can determine whether one of the sensors has failed. If so, the transmission control module can estimate the signal of the failed sensor based on a predetermined relationship between an expected signal from the failed sensor and the signals received from one or more of the working sensors. Accordingly, an exemplary system is presented that can identify malfunctioning sensors and compensate for inaccurate signals received from the malfunctioning sensors. Moreover, the transmission control module includes multiple processing paths that allow the transmission control module to independently evaluate the signals received from the sensors to safeguard against a malfunctioning processing path within the transmission control module.

Figure 1:
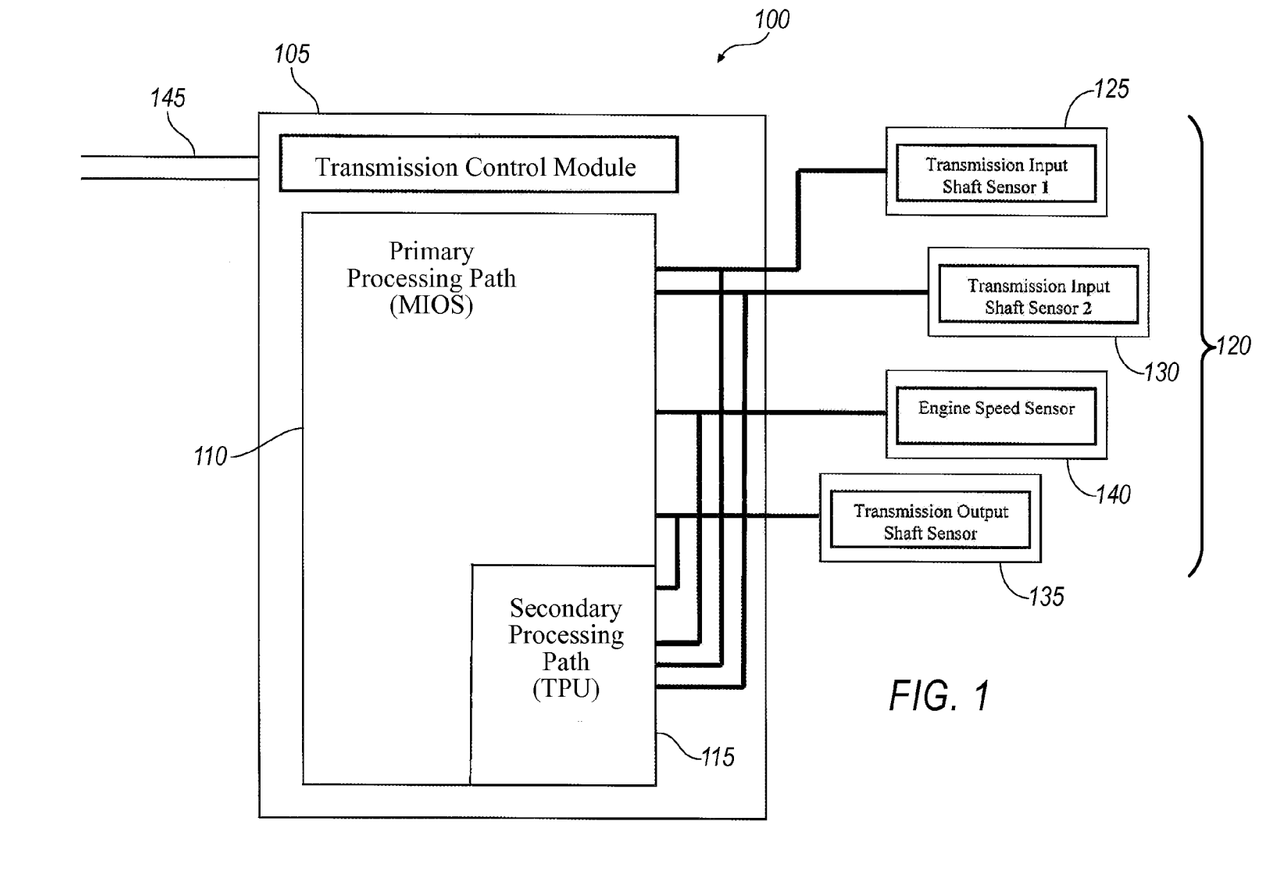
FIG. 1 illustrates an exemplary system having a first exemplary transmission control module with two exemplary processing paths receiving signals from a plurality of sensors.

FIG. 1 illustrates an exemplary system 100 having a transmission control module with a primary processing path and a secondary processing path, each receiving signals from various sensors. The system 100 may take many different forms and include multiple and/or alternate components and facilities. While an exemplary system 100 is shown in FIG. 1, the exemplary components illustrated in the figures are not intended to be limiting. Indeed, additional or alternative components and/or implementations may be used.

As illustrated in FIG. 1 the exemplary system 100 includes an exemplary transmission control module 105 with a primary processing path 110 and a secondary processing path 115, each receiving signals from a plurality of sensors 120. When the system 100 is used in, for example, an automotive powertrain implementation, the plurality of sensors 120 may include a first input shaft sensor 125, a second input shaft sensor 130, and an output shaft sensor 135 to measure the speeds of various portions of a transmission. The plurality of sensors 120 may further include an engine sensor 140 to measure the speed of an engine (e.g., an engine flywheel or crankshaft). Of course, the system 100 may include fewer, additional, or alternative sensors 120. For example, when the system 100 is used with a dual-clutch transmission, the system 100 may include both the first input shaft sensor 125 and the second input shaft sensor 130. However, in a single-clutch implementation, only the first input shaft sensor 125 may be used.

The sensors 120 may communicate with the transmission control module 105 via signal lines. Although a single signal line is illustrated connecting each sensor 120 to each processing path 110, 115, the sensors 120 may communicate with the transmission control module 105 with multiple signal lines. For instance, one signal line may communicate an information signal, a second signal line may communicate a return signal, and a third signal line may communicate a reference signal.

Each of the sensors 120 may include a current-based pulse width modulation (PWM) sensor with variable frequency. Accordingly, each sensor 120 may output a signal that includes a series of pulses. The duty cycle of each pulse may be directly proportional to the speed measured by the sensors 120. In a variable frequency PWM implementation, the frequency of the pulses may change as the speed changes. Therefore, the duty cycle may represent the speed of the various portions of the transmission or engine measured by the sensors 120. Each sensor 120 may be configured to detect the magnitude of the rotation of the shaft monitored. Alternatively, one or more of the sensors 120 may be a voltage-based PWM sensor or a variable reluctance sensor, for instance.

However, one or more of the sensors 120 may be bidirectional. The bidirectional sensors 120 may be configured to detect the direction in which the shaft rotates in addition to the magnitude of the rotation. For example, the engine shaft rotates in a single direction. Therefore, the engine sensor 140 need not be bidirectional. However, the output shaft of the transmission may rotate in two directions (e.g., one direction for forward gears and another direction for reverse gears) so the output shaft sensor 135 may be bidirectional to provide the transmission control module 105 with the magnitude of the rotation and the direction of the rotation. In addition, one or both of the input shaft sensors 125, 130 may be bidirectional. For instance, the input shaft sensor that measures the speed of the input shaft associated with both forward and reverse gears may be bidirectional. Alternatively, both input shaft may be associated with forward and reverse gears. The signals output by the sensors 120 that are bidirectional may represent both magnitude and direction of rotation while the signals output by sensors 120 that are unidirectional may represent the magnitude of rotation. As previously discussed, the magnitude of the rotation may be determined from the frequency of the pulses output by the sensors 120. One way to represent direction is to polarize the signals output by the bidirectional sensors. For example, a positive (+) signal may represent that the shaft is spinning in a forward direction while a negative (−) signal may represent that the shaft is spinning in a reverse direction.

The first input shaft sensor 125 may be configured to measure a speed of the input shaft of a transmission. The input shaft may be mechanically coupled to an engine via, e.g., the engine's crankshaft. In a single-clutch configuration, when the engine is coupled to the input shaft of the transmission, the input shaft rotates. As discussed in further detail below, the speed at which the input shaft rotates is proportional to the speed at which the engine crankshaft or flywheel rotates. The first input shaft sensor 125 may measure the speed of the rotation of the first input shaft and output a signal representative of that speed. In a single clutch configuration, the first input shaft sensor 125 may be bidirectional because the input shaft rotates in two directions (e.g., forward and reverse). Therefore, the first input shaft sensor 125 may output a signal representative of the magnitude of the speed of the first input shaft and the direction of the first input shaft.

In a dual-clutch configuration, the transmission has two input shafts. Therefore, in a dual-clutch configuration, the first input shaft sensor 125 may measure the rotational speed of the first input shaft while the second input shaft sensor 130 may measure the rotational speed of the second input shaft. In a dual-clutch configuration, either one or both of the first and second input shaft sensor 125, 130 may be bidirectional. For instance, if the first input shaft sensor 125 measures the speed of an input shaft responsible for the reverse gear, the first input shaft sensor 125 may be bidirectional. In this exemplary approach, the second input shaft sensor 130 may measure the speed of an input shaft responsible for only forward gears, and thus, may be unidirectional. If both input shafts are responsible for forward and reverse gears, both input shaft sensors 125, 130 may be bidirectional. Accordingly, the second input shaft sensor 130 may output a signal representative of the rotational speed of the second input shaft, but not direction.

Generally, in a dual-clutch configuration, only one input shaft passes torque from the engine. While each of the first input shaft sensor 125 and the second input shaft sensor 130 may constantly measure the speed of the respective input shafts, only the signals from the input shaft sensor measuring the speed of the input shaft passing torque may be relevant at any given time. Therefore, the transmission control module 105 may be configured to ignore signals from one or both of the input shaft sensors if that input shaft sensor is not measuring the speed of an input shaft that is passing torque. However, there are times when both input shafts pass torque. For example, both input shafts may pass torque briefly while the transmission is shifted from one gear to another. During times when both input shafts are passing torque, the transmission control module 105 may receive signals from both the first input shaft sensor 125 and the second input shaft sensor 130.

The output shaft sensor 135 may be configured to measure the rotational speed of an output shaft of the transmission and generate a signal representative of the rotational speed of the output shaft. The output shaft sensor 135 may be bidirectional since the output shaft of the transmission may rotate in two directions (e.g., forward and reverse). Accordingly, in addition to speed, the signal output by the output shaft sensor 135 may further indicate the direction in which the output shaft is rotating.

The engine sensor 140 may be configured to measure a rotational speed of a portion of the engine and output a signal representative of the rotational speed measured. For example, the engine sensor 140 may measure the rotation of the engine flywheel although the engine sensor 140 may measure other portions of the engine in addition to or instead of the engine flywheel to determine the engine speed. For example, the engine sensor 140 may measure the rotation of the engine flywheel or crankshaft. Moreover, the engine sensor 140 may measure the speed of the rotation of the engine flywheel and calculate the speed of the crankshaft since the flywheel may be mechanically coupled to the crankshaft. As previously discussed, the crankshaft is coupled to the first input shaft in a single-clutch transmission system or the first input shaft, the second input shaft, or both, in a dual-clutch transmission system. Additionally, the engine speed may be measured by another sensor (not shown) that can communicate with the transmission control module 105 using, for example, a controller area network (CAN) bus 145. This way, the engine speed measured by the engine sensor 140 can be compared with the speed measured and transmitted via the CAN bus 145 to verify that the engine sensor 140 is working properly.

The transmission control module 105 may be in communication with each of the sensors 120. Specifically, after each of the sensors 120 has measured the speed of their respective portion of the transmission or engine, each sensor may output a signal representative of that speed. The transmission module may be configured to receive the signals representing the rotational speed measured by each sensor and, if possible, the direction of the rotation. The transmission control module 105 may include multiple processing paths to receive and process the signals from the sensors 120 independently along each of the processing paths.

The transmission control module 105 may be configured to perform several layers of diagnostic testing. For example, the transmission control module 105 may be configured to determine whether one or more of the processing paths are functioning correctly and whether the sensors 120 are functioning correctly.

As illustrated in FIG. 1, the transmission control module 105 includes a primary processing path 110 and a secondary processing path 115, although additional processing paths may be included. Both the primary processing path 110 and secondary processing path 115 receive the signals generated by each of the sensors 120. The transmission control module 105 is configured to independently process the signals received via the primary and secondary processing paths 110, 115. For instance, the transmission control module 105 may compare the values calculated from the secondary processing path 115 to the values calculated from the primary processing path 110, and if the values are substantially the same, the transmission control module 105 may determine that the primary processing path 110 is functioning properly.

The transmission control module 105 may include any processing unit that is capable of processing the signals output by each of the sensors 120 along the primary processing path 110, the secondary processing path 115, or both. For example, the transmission control module 105 may be configured to determine how and when to change gears for optimum performance, fuel economy, shift quality etc. based on the signals received and processed along the primary and secondary processing paths 110, 115.

Moreover, the transmission control module 105 may be configured to compare the results of any processes performed from signals received along the primary processing path 110 or the secondary processing path 115. If the results are substantially the same, the transmission control module105 may be configured to determine that the primary processing path 110 is operating correctly. If the results are substantially different, the transmission control module 105 may be configured to determine that the primary processing path 110 has malfunctioned. To ensure that the secondary processing path 115 is operating properly, the transmission control module 105 may further include a tertiary processing path (not shown) and perform the same calculations as on the signals from the sensors 120 received along the tertiary processing path as those performed on the signals received via the primary processing path 110 and the secondary processing path 115. If the processing of the signals along two of the three processing paths generates the same values, the transmission control module 105 may be configured to determine that those two processing paths are operating properly and use those values. Alternatively, the transmission control module 105 may employ other ways to determine whether signals are properly processed along the primary processing path 110 and the secondary processing path 115.

If there is a malfunction, the transmission control module 105 may indicate to, for example, a driver of a vehicle or a vehicle technician that there is a problem that needs attention. For instance, the transmission control module 105 may cause a dashboard indicator light to illuminate indicating that there is a problem with the transmission control module 105 or the primary processing path 110. Additional processing paths may be used, for example, to determine whether the secondary processing path 115 is operating properly.

Figure 2:
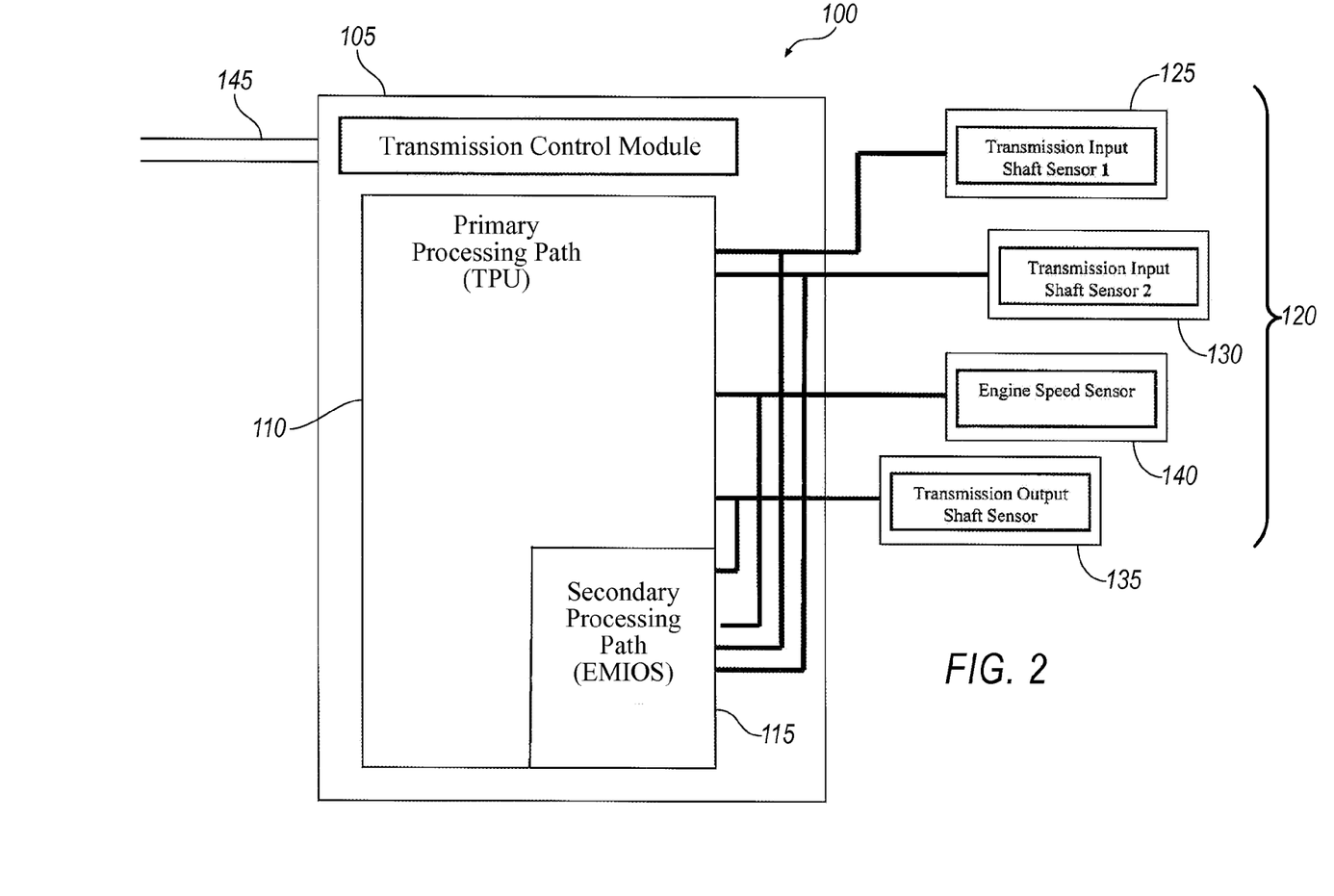
FIG. 2 illustrates an exemplary system having a second exemplary transmission control module with two exemplary processing paths receiving signals from a plurality of sensors.
Figure 3:
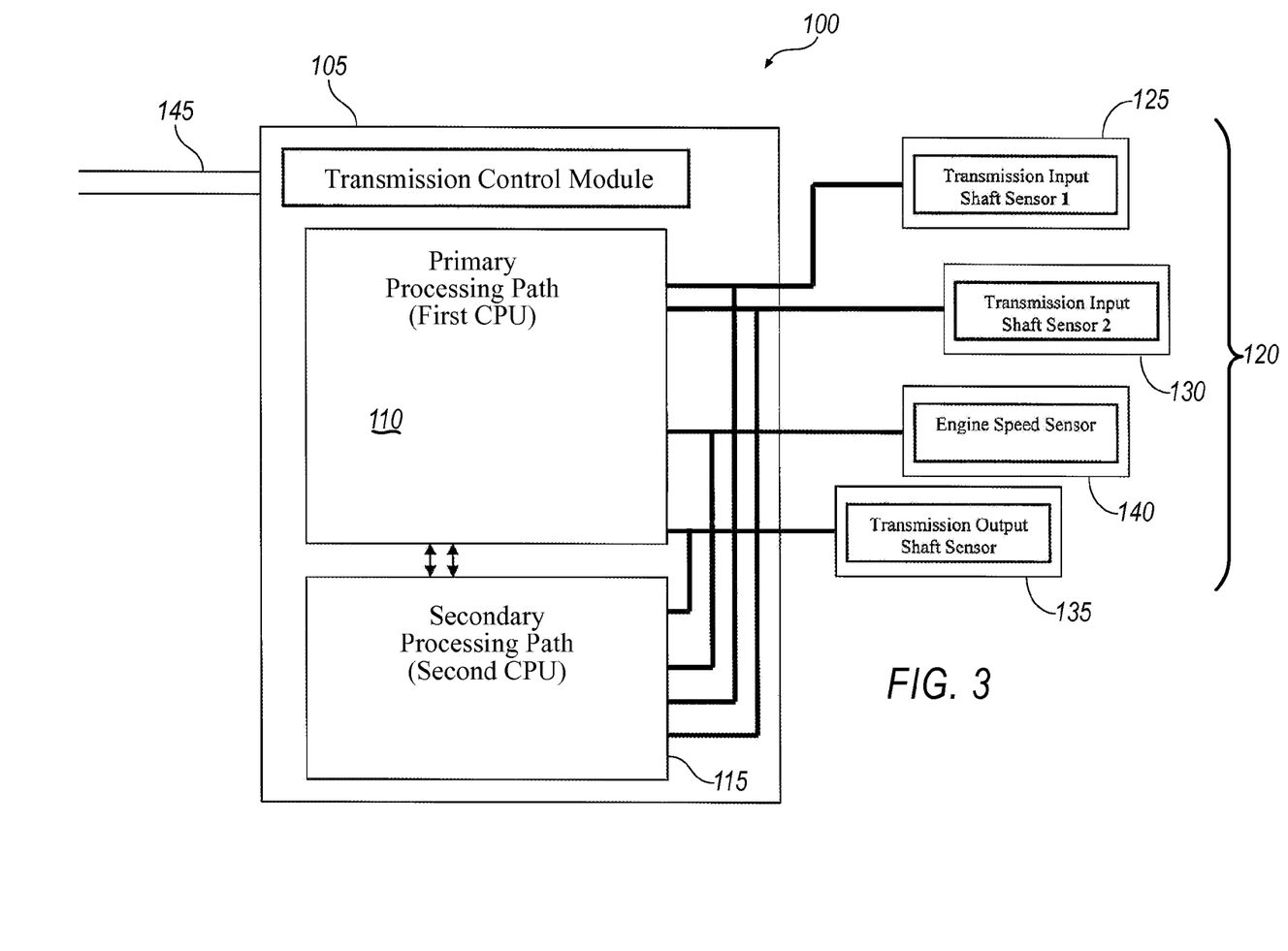
FIG. 3 illustrates an exemplary system having a third exemplary transmission control module with two exemplary processing paths receiving signals from a plurality of sensors.

Signals received along the primary and secondary processing paths 110, 115 may be processed by any number of different processing units. As illustrated in FIG. 1, both the transmission control module 105 includes a modular I/O subsystem (MIOS) to process signals along the primary processing path 110 and a time processor unit (TPU) such as enhanced time processor units to process signals along the secondary processing path 115. Referring to FIG. 2, however, a time processor unit processes the signals received along the primary processing path 110 while an enhanced modular I/O subsystem (EMIOS) processes signals received along the secondary processing path 115. In another alternative approach, as illustrated in FIG. 3, the transmission control module 105 may include multiple processors, each processing signals along different processing paths. For instance, one central processing unit (CPU) may process signals along the primary processing path 110 while another CPU processes signals received along the secondary processing path 115. In this approach, a link may be established to ensure that the processors compare information relative to a time reference. This way, the transmission control module 105 will not identify a processing path error due to a lag in processing time between the two processors independently processing signals along the primary processing path 110 and the secondary processing path 115. Of course, the transmission control module 105 may include any number of processing paths of the same or varying types.

Figure 4:
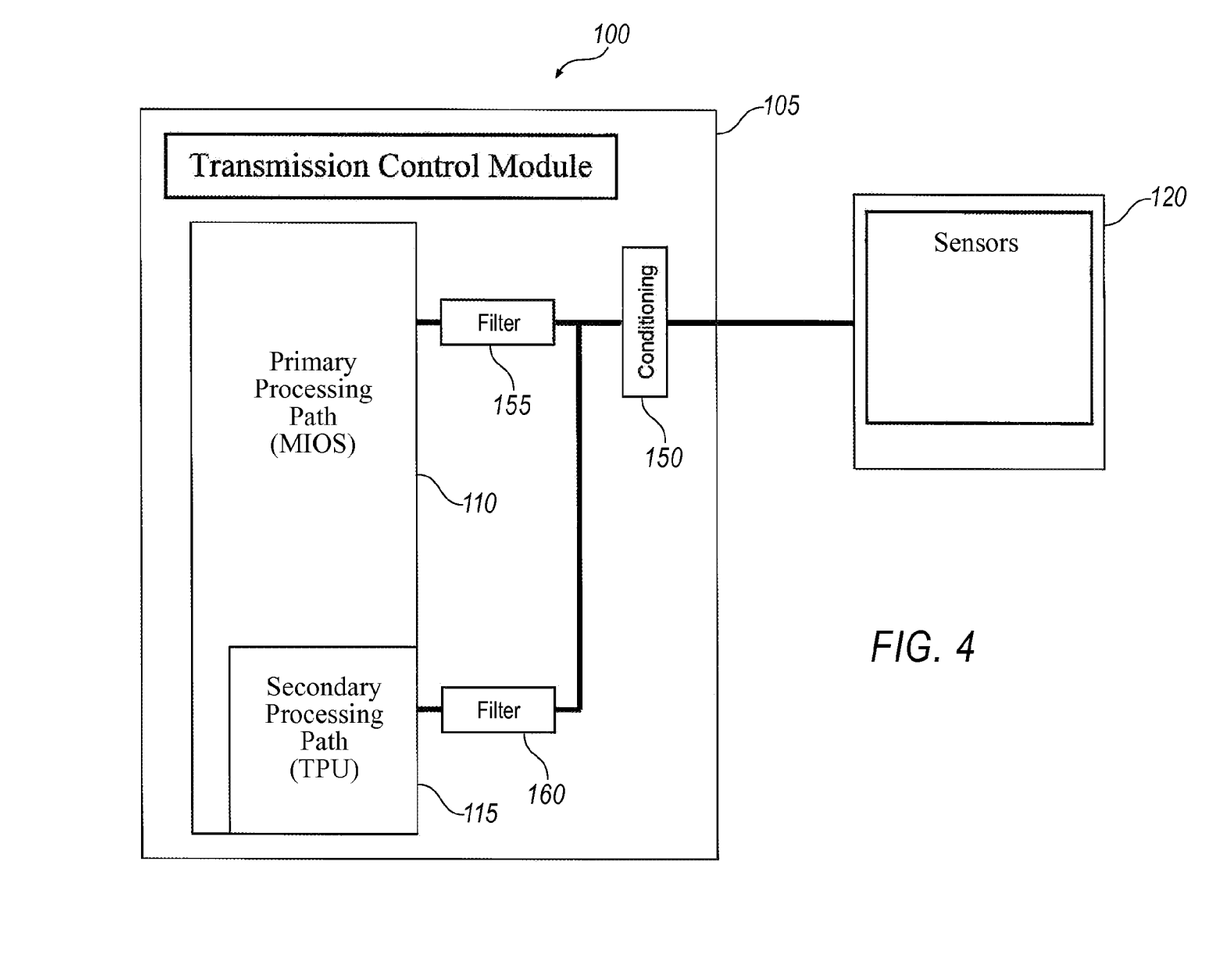
FIG. 4 illustrates an exemplary system having the first exemplary transmission control module with a conditioning circuit and filters.
Figure 5:
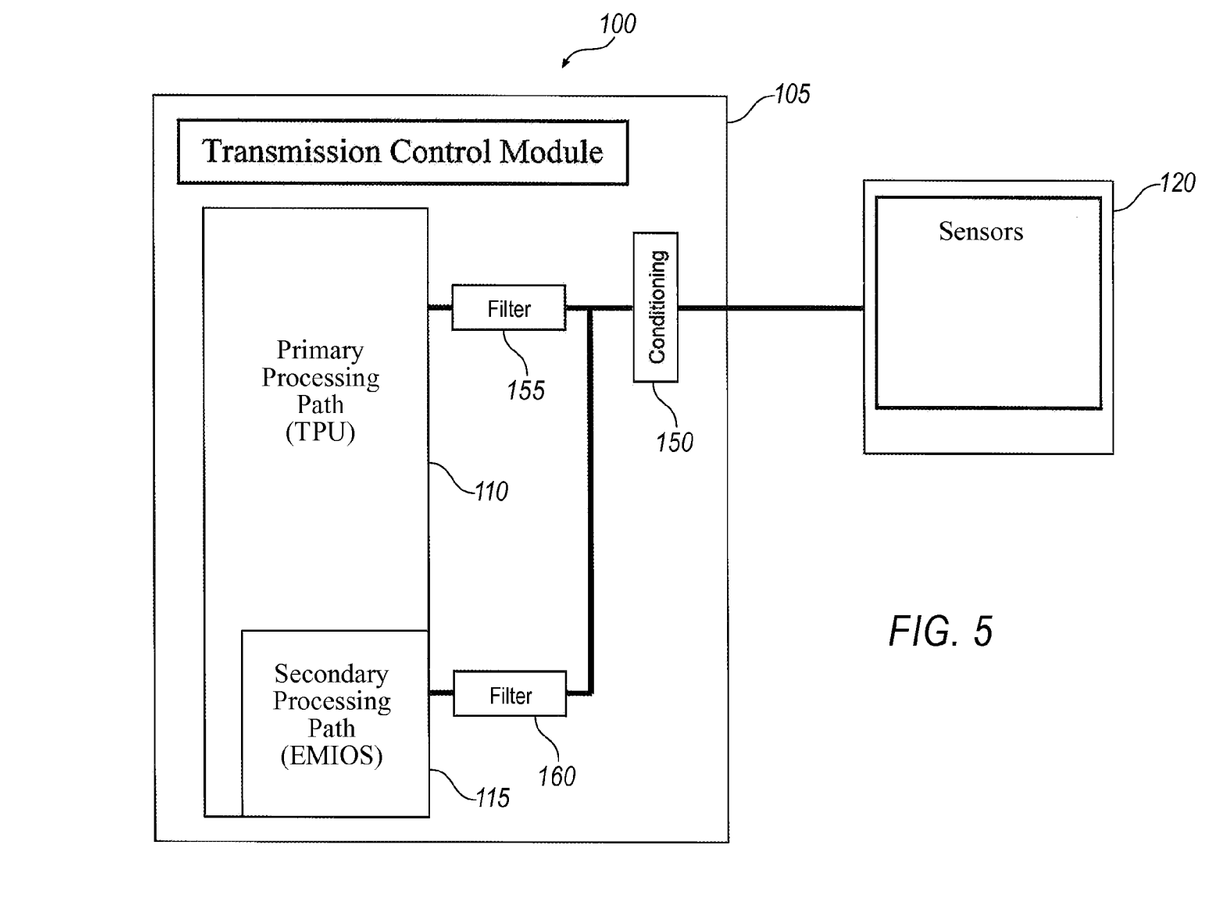
FIG. 5 illustrates an exemplary system having the second exemplary transmission control module with a conditioning circuit and filters.
Figure 6:
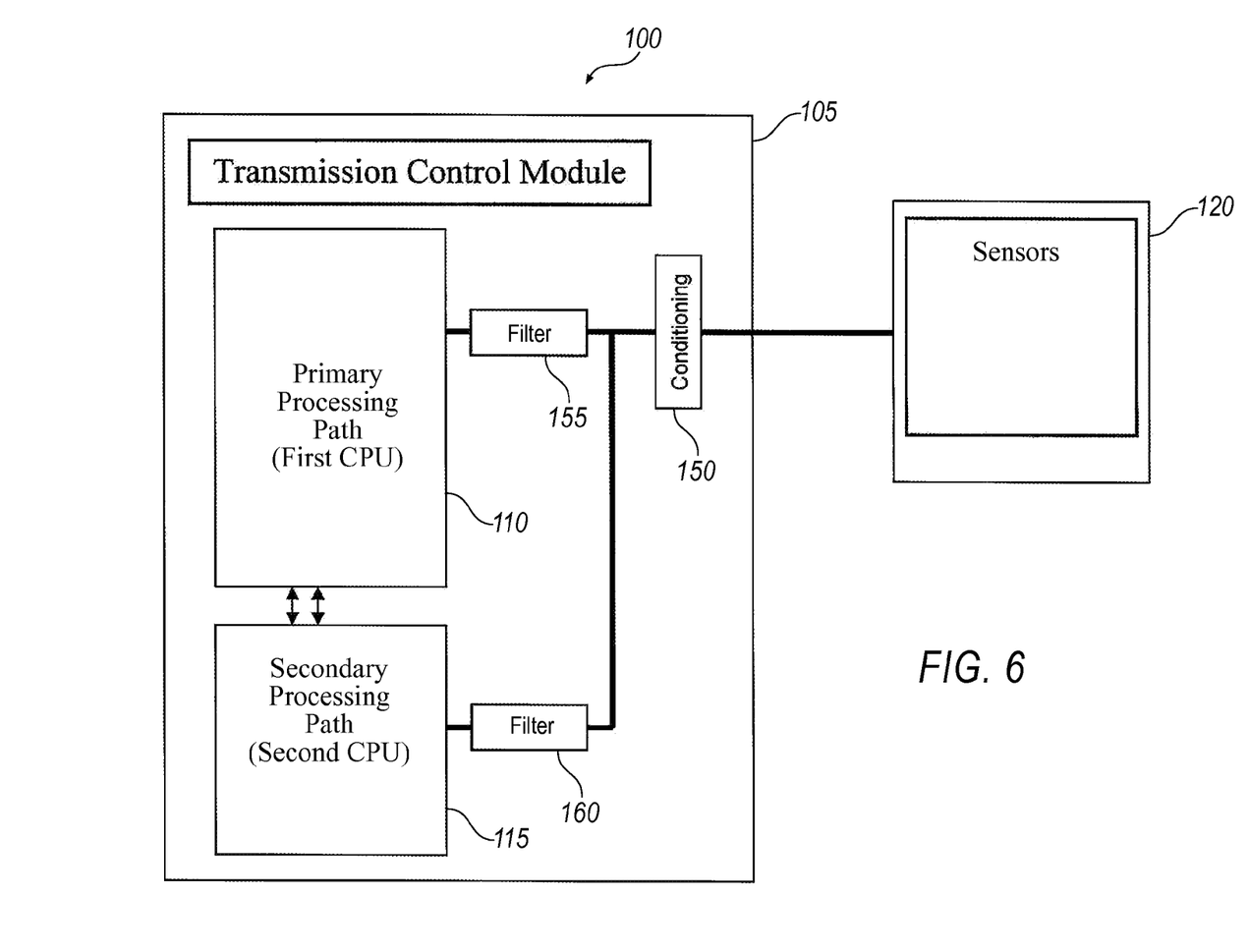
FIG. 6 illustrates an exemplary system having the third exemplary transmission control module with a conditioning circuit and filters.

FIGS. 4-6 illustrate exemplary systems 100 where the transmission control module 105 includes a conditioning circuit 150 and a plurality of filters 155, 160. As illustrated in FIG. 4, a modular I/O subsystem (MIOS) processes signals received along the primary processing path 110 and a time processing unit (TPU) processes signals received along the secondary processing path 115. FIG. 5 illustrates a time processing unit (TPU) processing signals received along the primary processing path 110 while a modular I/O subsystem (MIOS) processes the signals received along the secondary processing path 115. FIG. 6 illustrates separate central processing units (CPU) processing the signals along the primary processing path 110 and secondary processing path 115. Of course, the transmission control module 105 may include any number of processors of the same or varying types for processing signals along the processing paths 110, 115.

The conditioning circuit 150 illustrated in FIGS. 4-6 may be configured to optimize the voltages of each of the signals output by each of the sensors 120. As previously discussed, the sensors 120 may output current-based PWM signals representative of the speed of various parts of the transmission or engine. Some of these signals may further indicate direction. Because the signals are current-based PWM signals, the conditioning circuit 150 may include a current mirror circuit that measures the current of the output signal and converts it to a voltage level optimized for the different processing paths 110, 115 of the transmission control module 105. As illustrated, the transmission control module 105 may include a single conditioning circuit 150 regardless of the number of processing paths. This way, the transmission control module 105 ensures uniform conditioning of the signals, which eliminates a faulty conditioning circuit 150 as a potential cause of processing differences between signals processed along the primary processing path 110 and the secondary processing path 115. Alternatively, one or more of the sensors 120 may output voltage-based PWM signals.

The plurality of filters 155, 160 may each include, for example, a resistor-inductor-capacitor (RLC) filter configured to filter the signals from the sensors 120. The sensors 120 may be filtered based on the requirements of transmission control module 105 along the primary processing path 110 or the secondary processing path 115. For instance, the filters 155, 160 may include a band-pass filter to allow one or both processing paths to only receive signals with frequencies within a predefined frequency range. Alternatively, the filters 155, 160 may include a low-pass filter. The filters 155, 160 may be implemented via hardware and in some instances partially implemented via software. For example, one or both filters 155, 160 may include a band-pass filter formed from a hardware-based low-pass filter and a software-based high-pass filter.

The transmission control module 105 may be configured to receive signals in different frequency ranges along each of the primary processing path 110 and the secondary processing path 115. Accordingly, the transmission control module 105 may include a first filter 155 for the primary processing path 110 and a second filter 160 for the secondary processing path 115, filters 155 and 160 being dissimilar. In some approaches filters 155 and 160 may be the same. Although two filters 155, 160 are illustrated in FIGS. 4-6, the transmission control module 105 may alternatively include a single filter that filters signals for both the primary processing path 110 and secondary processing path 115. Moreover, if additional processing paths are present, the transmission control module 105 may include additional filters for each of those processing paths.

Figure 7:
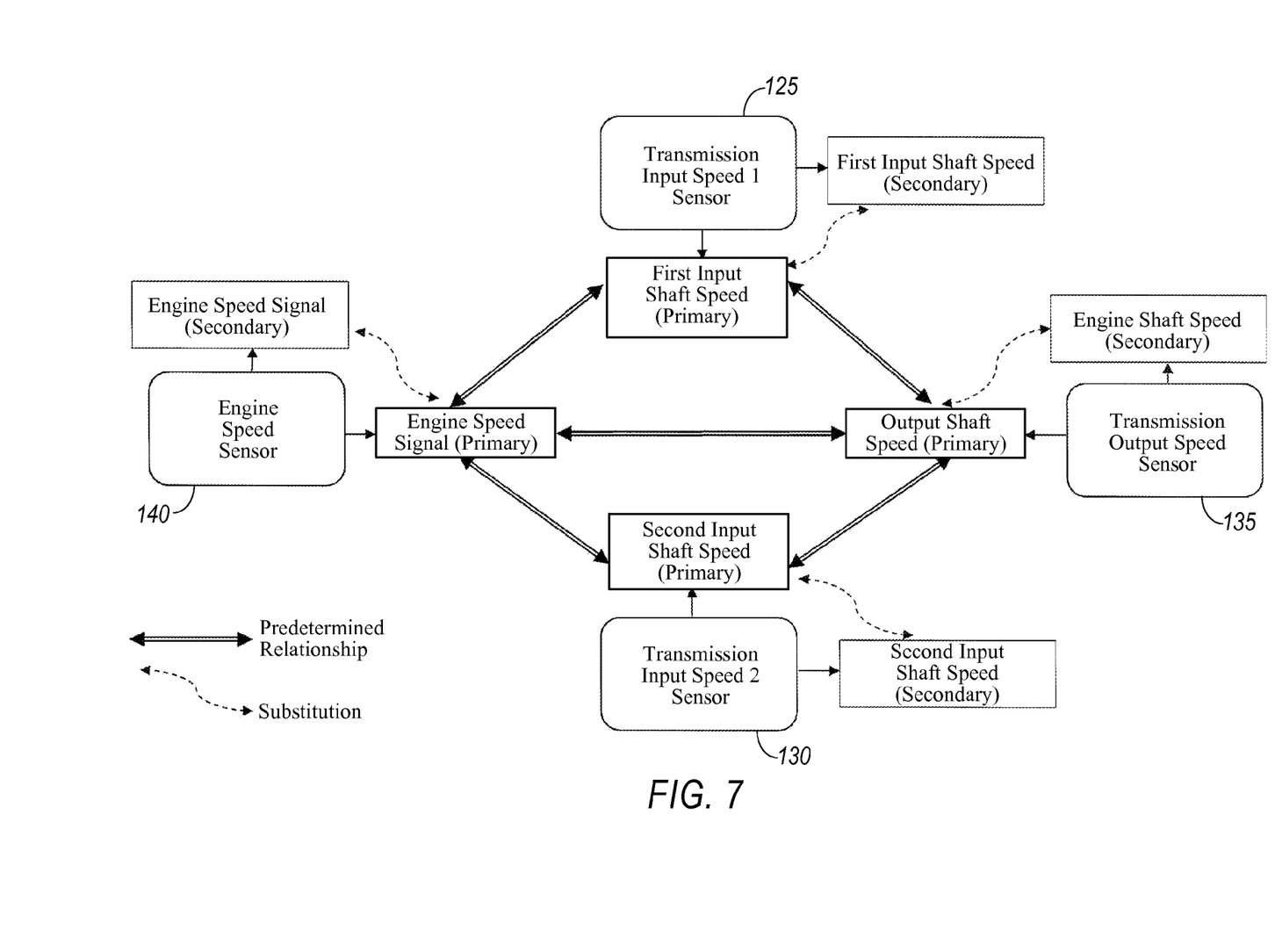
FIG. 7 illustrates an exemplary diagram that represents the relationships between each of a plurality of sensors.

FIG. 7 illustrates an exemplary diagram that represents the relationships between each of the sensors 120. Based on these relationships, the transmission control module 105 may be configured to identify at least one of the sensors 120 as a failed sensor and the remaining sensors 120 as working sensors. Furthermore, the transmission control module 105 may be configured to estimate the signal of the failed sensor based on a predetermined relationship between an expected signal from the failed sensor and the signals received from one or more of the working sensors.

In FIG. 7, the double lines with arrows indicate that a predetermined relationship exists between the signals measured by the sensors 120. As illustrated, the speed measured by any one sensor 120 can be estimated by the speeds measured by at least two other sensors 120. For instance, the speeds of the input shafts may be estimated from the engine speed or the speed of the output shaft. The speed of the engine may be estimated from the measured speeds of either input shafts or the output shaft. The speed of the output shaft may be estimated from the measured speeds of either input shafts or the engine. The direction of the output shaft may be determined from the gear selection.

FIG. 7 indicates that a predetermined relationship exists between the expected signal from the engine sensor 140 and the signals received from the first and second input shaft sensors 125, 130. Specifically, the predetermined relationship between the expected engine speed signal and the received speeds of first or second input shafts may be a function of a clutch engage fraction which may be calculated directly or indirectly by the transmission control module 105. The clutch engage fraction may represent the amount of engagement between the clutch and the engine. When the clutch is fully engaged, the transmission input shaft rotates at substantially the same speed as the engine. As the amount of clutch engagement is reduced, the transmission input shaft rotates at a different speed than the engine. The transmission control module 105 may be configured to account for differences in the rotational speed of the engine due to slippage, such as micro-slip or rate-controlled slip. This way, the transmission control module 105 may more accurately estimate the speed of the engine from either the first or second input shaft sensors 125, 130 or estimate the speeds of either the first or second input shafts from the speed of the measured by the engine sensor 140.

The speed of the engine may be related to the output shaft of the transmission via the clutch engage fraction as previously described and the ratio of the selected gear in the transmission. In addition, the transmission control module 105 may be configured to account for slippage due to, for instance, micro-slip or rate-controlled slip. Based on these predetermined relationships, the transmission control module 105 may be configured to estimate the speed of the output shaft based on the speed of the engine, and vice versa. The direction of the output shaft may be determined from the selected gear. For instance, if the selected gear is a reverse gear the direction will be different than if the selected gear is one of the forward gears.

The speeds of the input shafts may be related to the speed of the output shaft via a predetermined relationship that is the function of the selected gear (i.e., gear ratios). Therefore, the speeds of the input shafts may further be estimated from the speed of the output shaft and the speed of the output shaft may be estimated from the speed of one or both of the input shafts.

The transmission control module 105 may be configured to only estimate the speeds of one or more failed sensors during certain conditions. For instance, if the first input shaft sensor 125 fails as part of a dual-clutch transmission system, but the first input shaft is not engaged with the engine, the transmission control module 105 need not estimate the speed of the first input shaft. Similarly, if the second input shaft sensor 130 fails but is not engaged with the engine, the transmission control module 105 need not estimate the speed of the second input shaft. Likewise, the transmission control module 105 may be configured to ignore the speed of a disengaged input shaft when estimating the speed of the engine or the output shaft.

Moreover, the transmission control module 105 may be configured to only estimate the speed of one of the input shafts using the speed of the output shaft when the vehicle is moving at a minimum speed (e.g., above 2 miles per hour). At lower speeds, for example, the estimated speed of the input shafts may not be as reliable. Additionally, as mentioned above, the transmission control module 105 may be configured to not estimate the speed of the output shaft if neither of the clutches in a dual-clutch transmission system nor the clutch in a single-clutch transmission system is engaged.

As illustrated in FIG. 7, if the primary processing path 110 experiences a failure, the transmission control module 105 may substitute the signals processed along the primary processing path 110 with the signals processed along the secondary processing path 115. When the primary processing path 110 is working properly, the transmission control module 105 may use the signals processed along the primary processing path 110 when estimating the values of any failed sensor. Therefore, the transmission control module 105 may use, for example, the engine signal labeled "engine speed signal (primary)" in FIG. 7 processed along the primary processing path 110 when determining the speed of the engine.

However, if the primary processing path 110 fails, the transmission control module 105 may instead use the corresponding signals processed along the secondary processing path 115. Continuing with the previous example, the transmission control module may use, for example, the engine signal labeled "engine speed signal (secondary)" in FIG. 7 processed by the secondary processing path 115 when determining the speed of the engine instead of the signal processed by the primary processing path 115 if the primary processing path 115 has failed.

The predetermined relationships may be stored in a database in the transmission control module 105 and accessible by the transmission control module 105 as the signals are processed along the primary processing path 110 and the secondary processing path 115. The database may include a lookup table that defines the predetermined relationship between the expected signal of the failed sensor and any of the working sensors. As previously discussed, the predetermined relationship defines an expected output for one of the sensors based on the outputs received from one or more other sensors. The predetermined relationship may be used to determine whether one of the sensors 120 is a failed sensor or a working sensor, and whether one of the processing paths 110 or 115 has failed.

For example, if the transmission control module 105 identifies either the first input shaft sensor 125 or the second input shaft sensor 130 as the failed sensor, the transmission control module 105 may estimate the rotational speed of the first input shaft or second input shaft, respectively, of the transmission using the information stored in the table. In addition, the estimate of the speed may be based on the type of failure or the way in which the failure was recognized.

Various problems may cause one or more of the sensors 120 to fail. For example, one or more of the sensors 120 may experience a wire failure caused by an open circuit, a short to ground, a short to battery, or the like. Alternatively, the problem may be caused by a malfunction in the way the transmission control module 105 processes information (i.e., the processing path). Wire failures may be detected by comparing an expected sensor value to the measured sensor value. Processing path errors may be detected if the transmission control module 105 fails to receive any information from one of the sensors 120 or if the information from the sensor 120 remains unchanged for a predetermined amount of time.

If the first input shaft sensor 125 or the second input shaft sensor 130 experiences a wire failure (i.e., open, short to ground, short to battery, etc.) or processing path error, the transmission control module 105 may detect the error by comparing the measurements taken by one of the input shaft sensors 125, 130 to the expected first and second input shaft speeds, respectively. The expected input shaft speeds may be determined from measurements of the engine sensor 140 or the measurements of the output shaft sensor 135. As previously discussed, the engine speed is related to the input shaft speed by the clutch engage fraction. Additionally, the speed of the input shaft is proportional to the speed of the output shaft by the selected gear.

The transmission control module 105 may be further configured to determine that the failed sensor caused the error and confirm that the error was not caused by a failure in one of the processing paths 110, 115 by ensuring that the signals processed along the processing paths 110, 115 are processed correctly as previously discussed. For example, if the transmission control module 105 does not receive signals from one or both of the input shaft sensors 125, 130 along the primary or secondary processing paths 110, 115, or if the value received by the transmission control module 105 does not change, the transmission control module 105 may determine that there is a processing path error between the transmission control module 105 and one of the input shaft sensors 125, 130 and characterize the failure as a processing path failure. However, if the transmission control module 105 verifies that the processing paths 110, 115 are working properly, the transmission control module 105 may characterize the faulty input shaft sensor 125 or 130 as the failed sensor.

If the transmission control module 105 determines that one of the input shaft sensors 125, 130 is a failed sensor, the transmission control module 105 can estimate the speed of the input shaft and substitute the measured speed with the estimated speed. For example, the transmission control module 105 may be configured to substitute the estimated input shaft speed based on the engine speed measured by the engine speed sensor 140 or the measured output shaft speed measured by the output shaft sensor 135. The transmission control module 105 may compensate for factors such as intentional micro-slip or rate-controlled slip when determining the expected input shaft speed or estimating the input shaft speed. Moreover, the transmission control module 105 may inform the vehicle operator of the failed sensor via, for example, an indicator light on the dashboard of the vehicle.

If the output shaft sensor 135 experiences a failure because of a wire failure (i.e., open, short to ground, short to battery, etc.) or processing path error, the transmission control module 105 may detect the error by comparing the measurements taken by the output shaft sensor 135 to the expected output shaft speed. The expected output shaft speed may be determined from the speed of the engine measured by the engine speed sensor 140 or the speed of one of the input shafts measured by either the first or second input shaft sensors 125, 130. As previously discussed, the engine speed is related to the output shaft speed based on the gear selected and the clutch engage fraction. The speed of the output shaft is also related to the speeds of the first and second input shafts via the selected gear.

The transmission control module 105 may further be configured to verify that both processing paths 110, 115 are operating properly to confirm that the difference between the expected output shaft speed and measured output shaft speed was not caused by a failure in one of the processing paths 110, 115. If the transmission control module 105 fails to receive the signals from the output shaft sensor 135 via one or more of the processing paths 110, 115, or if the value received along the processing paths 110, 115 does not change, the transmission control module 105 may determine that there is a processing path error present at one or more of the processing paths 110, 115 and characterize the failure as a processing path failure. However, if the transmission control module 105 determines that the signals are being properly processed along the processing paths 110, 115, the transmission control module 105 may characterize the faulty output shaft sensor 135 as the failed sensor.

If the transmission control module 105 determines that the output shaft sensor 135 has failed, the transmission control module 105 may estimate the speed of the output shaft and substitute the speed measured by the failed output shaft sensor 135 with the estimated speed from either the engine speed sensor 140 or one of the input shaft sensors 125, 130. Further, the transmission control module 105 may compensate for factors such as micro-slip or rate-controlled slip when calculating the expected output shaft speed or estimating the output shaft speed. Moreover, the transmission control module 105 may inform the vehicle operator of the failed sensor via, for example, and indicator light of the dashboard of the vehicle.

The engine sensor 140 may further be subject to a wire failure or processing path error. In addition, another engine sensor (not shown) in communication with the transmission control module 105 via the CAN bus 145 may experience a wire failure or processing path error. The transmission control module 105 may detect the failure in the engine sensor 140 by comparing the measurements taken by the engine sensor 140 to the expected engine speed or the other engine sensor (not shown). Alternatively, the transmission control module 105 may detect that the other engine sensor (not shown) has failed by comparing the measurement taken by that sensor with the expected engine speed from the engine sensor 140 or estimated from one of the other sensors 120. Specifically, the expected engine speed may be estimated from the speed of one or both of the input shafts or the speed of the output shaft. As discussed above, the engine speed is related to the speed of the input shafts via the clutch engage fraction. The speed of the engine is proportional to the speed of the output shaft and can be determined from the clutch engage fraction and the selected gear.

The transmission control module 105 may further be configured to verify that signals from the engine sensor 140 are processed correctly along both processing paths 110, 115 to confirm that the difference between the expected engine speed and measured engine speed was not caused by a processing path failure. If the transmission control module 105 does not receive information from the engine sensor 140 via one or both of the processing paths 110, 115, or if the information received from the engine sensor 140 does not change, the transmission control module 105 may determine that there is a processing path error present between the engine sensor 140 and one or both of the processing paths 110, 115 and characterize the failure as a processing path error. After verifying that the signals are processed correctly along the processing paths 110, 115, the transmission control module 105 may characterize the faulty engine sensor 140 as the failed sensor.

If the transmission control module 105 determines that the engine sensor 140 has failed, the transmission control module 105 may estimate the speed of the engine and substitute the speed measured by the failed engine sensor 140 with the estimated speed from either the output shaft sensor 135 or one of the input shaft sensors 125, 130. Further, the transmission control module 105 may compensate for factors such as micro-slip or rate-controlled slip when calculating the expected output shaft speed or estimating the output shaft speed. Alternatively, the transmission control module 105 may substitute the engine speed measured by another engine sensor (not shown) in communication with the transmission control module 105 via the CAN bus 145 for the engine speed measured by the engine sensor 140. Moreover, the transmission control module 105 may inform the vehicle operator of the failed sensor via, for example, and indicator light of the dashboard of the vehicle.

Another potential problem that the transmission control module 105 may be configured to detect may include a reference voltage failure. For example, the transmission control module 105 may pair one of the bidirectional sensors with one of the unidirectional sensors to determine whether one or more of the sensors have experienced a reference voltage failure. As previously discussed, the output shaft sensor 135 and the first input shaft sensor 125 may be bidirectional. Therefore, the transmission control module 105 may pair, for example, the first input shaft sensor 125 (bidirectional) with the engine sensor 140 (unidirectional) and the output shaft sensor 135 (bidirectional) with the second input shaft sensor 130 (unidirectional). The transmission control module 105 may be configured to compare the voltages of the signals received from the first input shaft sensor 125 and the engine sensor 140.

Computing devices, such as the transmission control module 105, generally include computer-executable instructions, where the instructions may be executable by one or more processing units such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system 100 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 8:
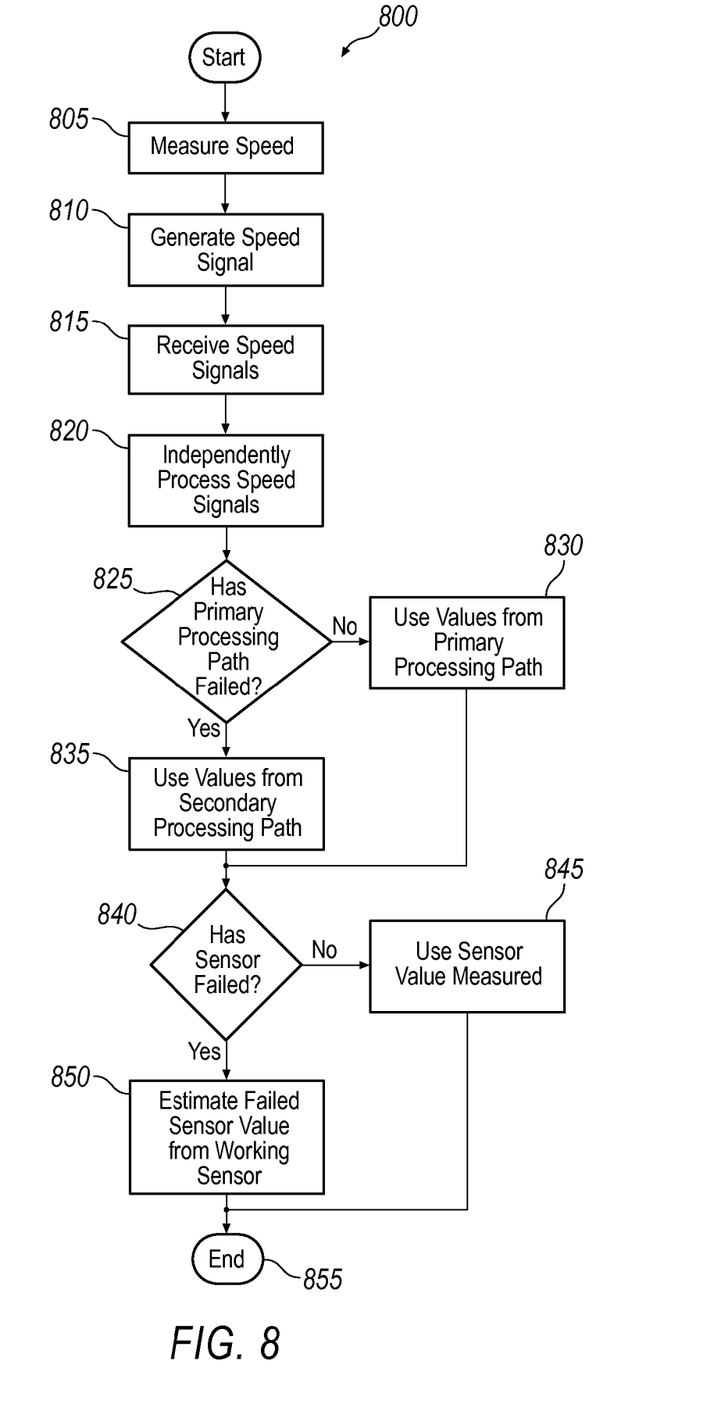
FIG. 8 illustrates an exemplary process flow diagram implemented by the system.

FIG. 8 illustrates an exemplary process flow diagram implemented by the system 100. Block 805 includes measuring a speed. As previously discussed, the system 100 includes a plurality of sensors 120 to measure, for example, a rotational speed of a first input shaft of a transmission, a second input shaft of the transmission, an output shaft of the transmission, and an engine.

Block 810 includes generating a signal representative of each of the speeds measured. The signal may represent the magnitude of the rotation as well as the direction of the rotation if the sensor 120 is a bidirectional sensor. For example, the output shaft sensor 135 and one of the input shaft sensors 125, 130 may generate signals that indicate both the magnitude and direction of the rotation of the output shaft and input shaft, respectively. However, the bidirectional sensors may alternatively generate two signals, one representative of the magnitude of the rotation and the other representative of the direction of the rotation.

Block 815 may include receiving each of the signals at the transmission control module 105. The transmission control module 105 may include one or more processors that receive and process the signals from each of the sensors 120 along one or more processing paths. For instance, the transmission control module 105 may receive and process signals along the primary processing path 110 and the secondary processing path 115.

Block 820 may include independently processing the signals. As previously discussed, the transmission control module 105 may independently perform the same operations on the signals along the primary processing path 110 and the secondary processing path 115.

Decision point 825 may include determining whether the processing along primary processing path 110 has failed. The transmission control module 105 may compare the values generated along the primary processing path 110 to the values generated along the secondary processing path 115. If the values are substantially the same, the transmission control module 105 may determine that the primary processing path 110 is working properly and the process may continue at block 830 where the values from the primary processing path 110 are used. Alternatively, if the values are substantially different, the transmission control module 105 may determine that the primary processing path 110 has failed, in which case the process may continue at block 835 with the values calculated along the secondary processing path 115.

Decision point 840 may include determining whether one or more of the sensors 120 have failed. The transmission control module 105 may be configured to identify at least one of the sensors 120 as a failed sensor by comparing the signals received along either the primary processing path 110 or the secondary processing path 115 with expected signals. For instance, using the signals processed along the primary processing path 110 or the secondary processing path 115, the transmission control module 105 may be configured to determine a speed from one of the signals and compare the speed to an expected speed based on, for example, the selected gear of the transmission, the clutch engage fraction, and the signals from one or more other sensors 120. If the transmission control module 105 determines that each sensor is working properly, at block 845, the transmission control module 105 uses the sensor values as measured by each of the working sensors 120. If the transmission control module 105 identifies one or more of the sensors 120 as the failed sensor, the process continues with block 850.

Block 850 includes estimating the signal of the failed sensor. The transmission control module 105 may estimate the signal based on a predetermined relationship between the signal of the failed sensor and the signal of one or more of the working sensors 120. For example, the predetermined relationship may be a function of a clutch engage fraction, the gear of the transmission, or a combination of these or other factors.

The process may end at block 855.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
a plurality of sensors each configured to output a signal at least partially representative of a speed of at least one of a first transmission input shaft, a second transmission input shaft, a transmission output shaft, and an engine; and
a transmission control module in communication with the plurality of sensors and configured to identify at least one of the plurality of sensors as a failed sensor and another of the plurality of sensors as a working sensor, wherein the transmission control module is configured to estimate the signal of the failed sensor based on a predetermined relationship between an expected signal from the failed sensor and the signal received from the working sensor and substitute the signal from the failed sensor with the expected signal.

2. A system as set forth in claim 1, wherein the transmission control module is configured to identify at least one of the plurality of sensors as the failed sensor by comparing each of the signals received from each of the plurality of sensors to the expected signal that corresponds to each of the signals received.

3. A system as set forth in claim 1, wherein the predetermined relationship is a function of at least one of a clutch engage fraction and a gear selection.

4. A system as set forth in claim 1, wherein the transmission control module is configured to independently process signals from the plurality of sensors along a primary processing path and a secondary processing path, wherein each of the plurality of sensors is configured to output signals along both the primary processing path and the secondary processing path.

5. A system as set forth in claim 4, wherein the transmission control module is configured to determine whether the primary processing path has failed by comparing at least one of the signals processed along the primary processing path with at least one of the signals processed along the secondary processing path.

6. A system as set forth in claim 4, wherein the transmission control module includes a primary filter in communication with the plurality of sensors and a secondary filter in communication with the plurality of sensors.

7. A system as set forth in claim 6, wherein at least one of the primary filter and the secondary filter includes a band-pass filter.

8. A system as set forth in claim 4, wherein the transmission control module includes at least one filter and at least one conditioning circuit in communication with the plurality of sensors and along each of the primary processing path and the secondary processing path.

9. A system as set forth in claim 8, wherein the at least one filter includes a band-pass filter and wherein the conditioning circuit includes a current mirror circuit.

10. A system as set forth in claim 1, wherein the transmission control module includes a conditioning circuit in communication with the plurality of sensors.

11. A system as set forth in claim 10, wherein the conditioning circuit includes a current mirror circuit.

12. A vehicle comprising:
a plurality of sensors each configured to output a signal at least partially representative of a speed of at least one of a first transmission input shaft, a second transmission input shaft, a transmission output shaft, and an engine; and a transmission control module in communication with the plurality of sensors and configured to identify at least one of the plurality of sensors as a failed sensor and another of the plurality of sensors as a working sensor, wherein the transmission control module is configured to estimate the signal of the failed sensor based on a predetermined relationship between an expected signal from the failed sensor and the signal received from the working sensor and substitute the signal from the failed sensor with the expected signal, wherein the transmission control module is configured to independently process signals from the plurality of sensors along a primary processing path and a secondary processing path, wherein the transmission control module is configured to determine whether the primary processing path has failed by comparing at least one of the signals processed along the primary processing path to at least one of the signals processed along the secondary processing path.

13. A vehicle as set forth in claim 12, wherein the transmission control module is configured to identify at least one of the plurality of sensors as the failed sensor by comparing each of the signals received from each of the plurality of sensors to the expected signal that corresponds to each of the signals received.

14. A vehicle as set forth in claim 12, wherein the predetermined relationship is a function of at least one of a clutch engage fraction and a gear selection.

15. A vehicle as set forth in claim 12, wherein the transmission control module includes a conditioning circuit in communication with the plurality of sensors, the conditioning circuit including a current mirror circuit.

16. A vehicle as set forth in claim 12, wherein the transmission control module includes a primary filter in communication with the plurality of sensors and a secondary filter in communication with the plurality of sensors, wherein at least one of the primary filter and the secondary filter includes at least one of a band-pass filter, a high-pass filter, and a low-pass filter.

17. A vehicle as set forth in claim 12, wherein each of the plurality of sensors is configured to output signals along both the primary processing path and the secondary processing path.

18. A method comprising:
measuring a speed of at least one of a first transmission input shaft, a second transmission input shaft, a transmission output shaft, and an engine with at least one of a plurality of sensors;
generating a signal representative of each of the speeds measured;
receiving each of the signals at a transmission control module;
identifying, at the transmission control module, at least one of the plurality of sensors as a failed sensor and at least one of the plurality of sensors as a working sensor;
estimating, at the transmission control module, the signal of the failed sensor based on a predetermined relationship between an expected signal from the failed sensor and the signal received from the working sensor; and
substituting the signal from the failed sensor with the expected signal.

19. A method as set forth in claim 18, wherein the transmission control module is configured to process the signals from the plurality of sensors along a primary processing path and a secondary processing path, and further comprising determining whether the primary processing path has failed.

20. A method as set forth in claim 19, wherein determining whether the primary processing path has failed includes comparing at least one of the signals processed along the primary processing path to at least one of the signals processed along the secondary processing path.

21. A method as set forth in claim 19, further comprising outputting the generated signal along both the primary processing path and the secondary processing path.

22. A method as set forth in claim 18, wherein identifying the at least one of the plurality of sensors as the failed sensor includes comparing the signals received from each of the plurality of sensors to an expected signal that corresponds to each of the signals received.

\* \* \* \* \*